UNITED STATES PATENT OFFICE.

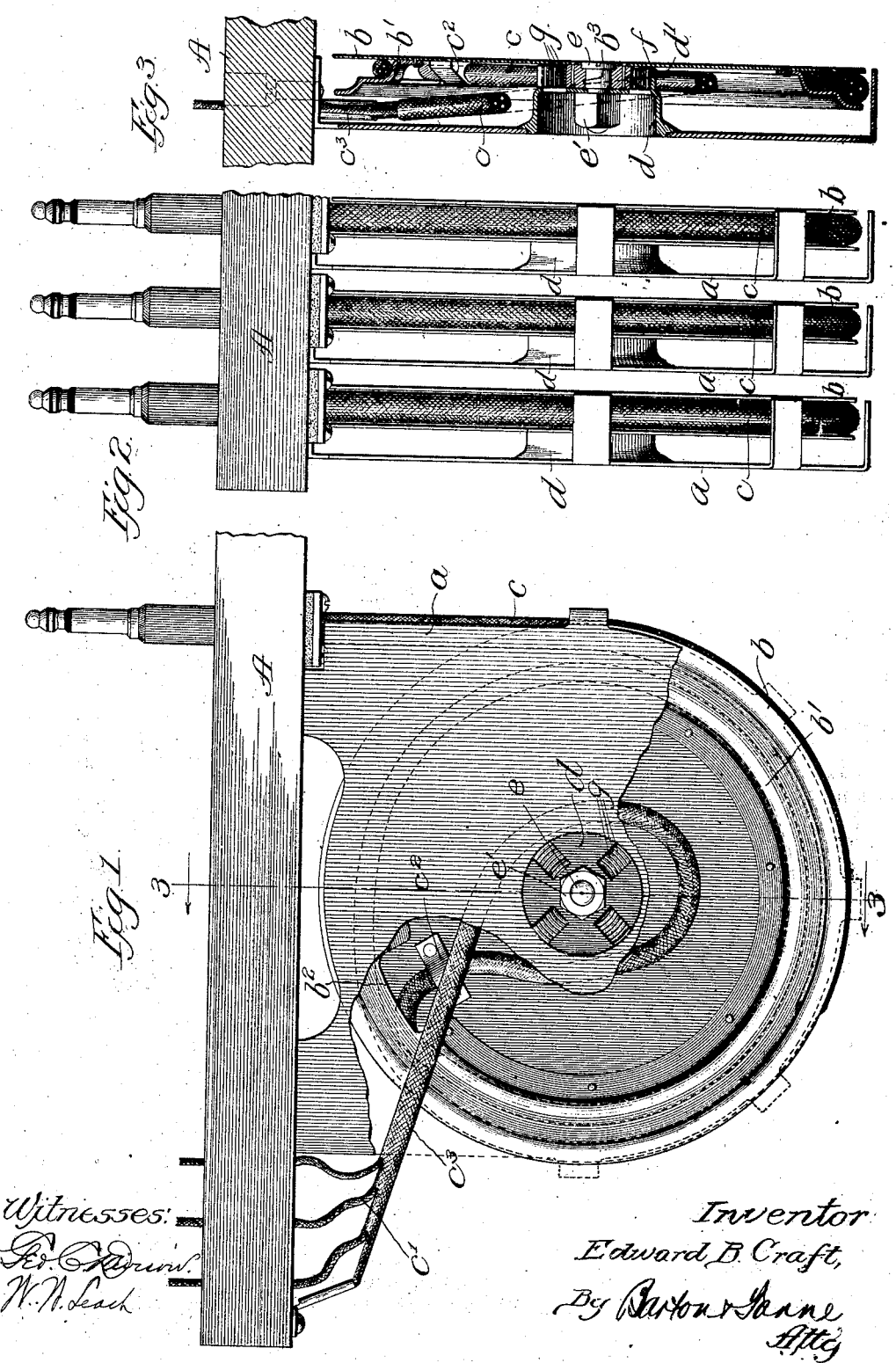

EDWARD B. CRAFT, OF CHICAGO, ILLINOIS, ASSIGNOR TO WESTERN ELECTRIC COMPANY, OF CHICAGO, ILLINOIS, A CORPORATION OF ILLINOIS.

SWITCHBOARD-CORD REEL.

No. 840,200.     Specification of Letters Patent.     Patented Jan. 1, 1907.

Application filed February 13, 1906. Serial No. 300,881.

*To all whom it may concern:*

Be it known that I, EDWARD B. CRAFT, a citizen of the United States, residing at Chicago, in the county of Cook and State of Illinois, have invented a certain new and useful Improvement in Switchboard-Cord Reels, of which the following is a full, clear, concise, and exact description.

My invention relates to a switchboard-cord reel, and has for its object to provide a device for holding the switch-plug cord when not in use in such manner as to take up the least possible space in the switchboard.

My object is, further, to lessen the amount of idle cord and the total length of cord necessary to a given plug-circuit.

In carrying out my invention I employ a sheave adapted to receive the plug-cord and from which the cord may be led to the key-shelf of the switchboard. The sheave is movably mounted upon the frame of the reel, which is adapted to be supported adjacent the key-shelf, a drum being secured between the sheave and frame and around which the idle portion of the cord is wrapped. Mechanism such as a helical spring is carried by the frame, adapted for operating the sheave to return the cord to its normal position after use.

I will describe my invention by reference to the accompanying drawings, wherein—

Figure 1 is a side elevation of a reel embodying my invention, showing the same mounted on the under side of a key-shelf of a switchboard with the frame-plate broken away. Fig. 2 is a front view of a number of reels mounted on the under side of a key-shelf, and Fig. 3 is a sectional view of a reel on line 3 3 of Fig. 1.

The same letters of reference designate the same parts throughout the several figures of the drawings.

Referring now to the drawings, which illustrate the preferred form of my invention, the frame-plate $a$ of the device is shown attached to the under side of the cord-shelf A, the frame carrying the sheave $b$, which is adapted to receive the cord $c$ when not in use and from which the cord is adapted to be led to the key-shelf. The sheave is rotatably secured to the frame $a$ and preferably consists of a metal disk having an annular flange $b'$, which serves with the outer surface of the disk as a seat for the cord. The sheave is provided with a peripheral groove of varying width to accommodate the varying diameter of the switch-cord, the flange $b'$ being preferably curved to form seats for such varying size of cord. The cord passes around the sheave and through an opening $b^2$ in the flange, being fastened at $c^2$ near its fixed end $c'$ to the side of the sheave, the idle portion $c^3$ of the cord between such connection $c^2$ and its fixed end $c'$ being wrapped around a drum $d$, lying between the plate $a$ and the sheave $b$ and secured to the frame-plate $a$. When the cord is drawn from the sheave, the portion $c^3$ thereof is unwrapped from the drum and reversely wrapped thereon, thus making it possible to economize in the length of idle cord. The drum is of less diameter than the sheave, so as to provide space for the flop of the idle portion of the cord as the cord is removed and restored. The drum $d$ is preferably cup-shaped and secured at its rim to the edge of an opening in the frame-plate. The drum also supports a spindle or bolt $e$, which acts as a bearing for the sheave. The sheave is held in place on the spindle by a nut $e'$.

Lugs $d'$ $d'$ project from the rear of the drum, being preferably struck up from the material of the drum, and form an annular chamber $f$ between the drum and sheave. The chamber $f$ is adapted to contain the mechanism I provide for operating the sheave to return the cord to its normal position after use. This mechanism preferably consists of a helical spring $g$, connected at one end with one of the lugs $d'$ and at the other end to the hub $b^3$ of the sheave. With this arrangement the spring $g$ tends to maintain the sheave in position to conceal the cord, and when the cord has been withdrawn from the sheave and released the spring operates the sheave to automatically return the cord to its normal position.

With my arrangement it will be seen that the switch-cords occupy less space in the switchboard than is the case with the present method, where weights are used to restore the cords. The reel also lends itself readily to use above the switchboard, where it may be mounted on a shelf fixed either to the top of the switchboard or otherwise, the operator drawing the cords down instead of up in making a connection, thus leaving the space underneath the key-shelf entirely free.

By means of my invention I am enabled to produce a reel which will be very compact and take up the least possible space. When the reels are to be placed underneath the cord-shelf, they may be mounted side by side, since the reels have but little width. Where, however, the plugs are located very close together on the key-shelf, each frame may be made of a length sufficient to hold two sheaves, and thus accommodate two cords, while reducing the number of frames by one-half.

I claim—

1. In a switchboard-cord reel, the combination with a frame, of a sheave adapted to hold the switch-cord, and from which the cord may be led for use, a drum between the frame and sheave around which the idle portion of the cord is wrapped, and mechanism adapted to operate said sheave to return the cord to normal position after use.

2. In a switchboard-cord reel, the combination with a frame, of a cord-sheave rotatably secured to the frame, a spring connecting said frame and sheave, the cord being led from said sheave against the tension of said spring, and a drum around which the idle portion of the cord is wrapped.

3. In a switchboard-cord reel, the combination with a frame-plate, of a spring carried thereby, a sheave rotatably secured to the frame, from which the switch-cord may be led against the tension of said spring, and a drum of less diameter than the sheave between the frame and sheave, around which the idle portion of the cord is wrapped, said portion upon the withdrawal of the cord from the sheave being unwrapped from the drum and wrapped thereon in a reverse direction.

4. In a switchboard-cord reel, the combination with a frame adapted to be supported adjacent the key-shelf of a switchboard, of a sheave rotatably secured to said frame, and from which the switch-cord is led to the key-shelf, the cord being secured near its fixed end to the sheave, a drum around which the portion of the cord between said connection and its fixed end is wrapped, said portion upon the withrawal of the cord from the sheave, being unwrapped from said drum and wrapped thereon in a reverse direction, and mechanism adapted to operate said sheave, to return said cord to its normal position after use.

5. In a switchboard-cord reel, the combination with a frame adapted to be supported adjacent the key-shelf of a switchboard, of a disk rotatably mounted upon said frame and having an annular flange secured thereto, forming with the disk a sheave for the switch-cord, the cord being led from said sheave to the key-shelf, and a spring carried by the frame adapted to operate the sheave to return the switch-cord to its normal position after use.

6. In a switchboard-cord reel, the combination with a frame-plate adapted to be supported adjacent the key-shelf of a switchboard, of a sheave for a switch-cord, said cord passing through an opening in the side of the sheave, and being secured near its fixed end to the sheave, a drum secured to the frame-plate, a spindle passing through said drum serving as a bearing for said sheave, the portion of said cord between its attachment to said sheave and its fixed end being wrapped around said drum and being unwrapped therefrom and reversely wrapped thereon upon the withdrawal of said cord from the sheave for use, lugs projecting from the rear of the drum and forming a chamber between the drum and sheave, and a helical spring within said chamber connecting said drum and sheave, said spring being adapted to operate said sheave to return the cord to its normal position after use.

7. A switchboard-cord reel comprising a sheave for switch-cords, having a peripheral groove of varying width to accommodate the varying diameter of a switch-cord.

8. A switchboard-cord reel comprising a disk provided with an annular flange forming with the disk a sheave for the switch-cord, said flange being curved to form seats to accommodate the varying diameter of the switch-cord.

9. In a switchboard-cord reel, the combination with a frame, of a sheave adapted to hold the cord and from which the cord may be led for use, said cord being secured near its fixed end to said sheave, a stationary drum between the frame and sheave around which the idle portion of the cord is wrapped, and mechanism adapted to operate said sheave, to return the cord to its normal position.

10. In a switchboard-cord reel, the combination with a frame-plate, of a disk rotatably mounted on said frame-plate, said disk having an annular flange forming with said disk a cord-sheave, a spring tending to maintain the cord within the sheave, and a casing for said spring secured between the plate and disk to said plate.

11. In a switchboard-cord reel, the combination with a frame, of a sheave adapted to hold the switch-cord, and from which the cord may be led for use, a drum around which the idle portion of the cord is wrapped, and means for operating said sheave to return the cord to normal position after use.

In witness whereof I hereunto subscribe my name this 10th day of February, A. D. 1906.

EDWARD B. CRAFT.

Witnesses:
 WINFIELD W. LEACH,
 GEORGE E. FOLK.